(12) United States Patent
Yang et al.

(10) Patent No.: US 8,861,435 B2
(45) Date of Patent: Oct. 14, 2014

(54) METHOD AND DEVICE FOR COMMUNICATION

(75) Inventors: Yong Yang, Mölndal (SE); Gunnar Rydnell, Västra Frölunda (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 634 days.

(21) Appl. No.: 12/979,612

(22) Filed: Dec. 28, 2010

(65) Prior Publication Data
US 2012/0113894 A1    May 10, 2012

Related U.S. Application Data

(63) Continuation of application No. PCT/EP2010/070425, filed on Dec. 21, 2010.

(60) Provisional application No. 61/410,373, filed on Nov. 5, 2010.

(51) Int. Cl.
*H04W 8/02* (2009.01)
*H04W 60/04* (2009.01)
*H04W 8/06* (2009.01)

(52) U.S. Cl.
CPC .............. *H04W 60/04* (2013.01); *H04W 8/06* (2013.01)
USPC ...................................................... 370/328

(58) Field of Classification Search
USPC ........ 370/331, 328, 338; 455/418, 435.1, 458
See application file for complete search history.

(56) References Cited

U.S. PATENT DOCUMENTS

| 2010/0056146 | A1 | 3/2010 | Guo et al. | |
| 2010/0260141 | A1* | 10/2010 | Chowdhury et al. | 370/331 |
| 2011/0312348 | A1* | 12/2011 | Kulakov et al. | 455/458 |
| 2012/0329440 | A1* | 12/2012 | Chin et al. | 455/418 |
| 2013/0053032 | A1* | 2/2013 | Guo | 455/435.1 |

FOREIGN PATENT DOCUMENTS

| EP | 2 159 972 A1 | 3/2010 |
| EP | 2 187 681 A1 | 5/2010 |
| EP | 2 214 444 A1 | 8/2010 |

OTHER PUBLICATIONS

International Search Report and Written Opinion of the International Search Authority mailed Aug. 5, 2011 in corresponding International Application No. PCT/EP2010/070425.
Generic Impact on TAU Identifiers When ISR is Used, 3GPP TSG SA WG2 Architecture—S2#60, Oct. 8-12, 2007, XP-002649217.
TAU Procedure with ISR, 3GPP TSG SA WG2 Architecture—S2#60, Oct. 8-12, 2007, XP-002649216.

* cited by examiner

*Primary Examiner* — Kwang B Yao
*Assistant Examiner* — Syed M Bokhari
(74) *Attorney, Agent, or Firm* — Nixon & Vanderhye P.C.

(57) ABSTRACT

A method and device for providing post idle mobility procedure. The method and device providing an indication of a Radio Access Technology (RAT) type after an Idle Mode Signaling Reduction (ISR).

11 Claims, 5 Drawing Sheets

METHOD AND DEVICE FOR COMMUNICATION

This application is a Continuation of PCT International Application No. PCT/EP2010/070425, filed 21 Dec. 2010, which designated the U.S. and claims the priority benefit of U.S. Provisional Application No. 61/410,373, filed 5 Nov. 2010, the entire contents of each of which are all hereby incorporated herein by reference.

BACKGROUND

In a typical cellular system, also referred to as a wireless communications network, wireless terminals, also known as mobile stations and/or User Equipment units (UES) communicate via a Radio Access Network (RAN) to one or more core networks. The wireless terminals can be mobile stations or user equipment units such as mobile telephones also known as "cellular" telephones, and laptops with wireless capability, e.g., mobile termination, and thus can be, for example, portable, pocket, hand-held, computer-included, or car-mounted mobile devices which communicate voice and/or data with radio access network.

The radio access network covers a geographical area which is divided into cell areas, with each cell area being served by a base station, e.g., a Radio Base Station (RBS), which in some networks is also called "NodeB" or "B node" and which in this document also is referred to as a base station. A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units within range of the base stations.

In some versions of the radio access network, several base stations are typically connected, e.g., by landlines or microwave, to a Radio Network Controller (RNC). The radio network controller, also sometimes termed a Base Station Controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) technology. UMTS Terrestrial Radio Access Network (UTRAN) is essentially a radio access network using wideband code division multiple access for user equipment units (UEs). The Third Generation Partnership Project (3GPP) has undertaken to further evolve the UTRAN and GSM based radio access network technologies. In 3GPP, work regarding 3G Long Term Evolution (LTE) systems is ongoing.

Mobility management is an important function in maintaining cellular networks. The goal of mobility management is to track where cellular phones, or User Equipments (UEs), are located in order for mobile phone services to be provided to the various UEs included in any given network.

Each base station of a cellular network covers a limited geographical area, which may be referred to as a cell. Integrating the coverage of a number Of base stations, or cells, provides a cellular network with radio coverage over a much wider area. In E-UTRAN, an eNodeB or a group of these base stations may be referred to as covering a Tracking Area (TA). A Routing Area (RA) may be formed from one or more of these cells as well.

A Tracking Area Update (TAU) and/or a Routing Area Update (RAU) procedure allows a UE to inform the cellular network when the UE moves from one TA and/or RA to another. When an UE detects it has moved to a different TA and/or RA and the UE is not registered for that TA and/or RA, the UE will send a TAU and/or RAU request to the cellular network in order to get a Tracking Area Identity (TAI) and/or Routing Area Identity (RAI) list of TAs and/or RAs associated with the UE's current location.

The network node typically responsible for mobility management is the Mobility Management Entity (MME) in LTE systems and the Serving General Packet Radio Service Support Node (SGSN) in 2G/3G systems. The MME and SGSN are key control nodes typically responsible for idle mode UE tracking, paging procedures, bearer activation/deactivation processes, and the MME and SGSN are also responsible for choosing a Serving Gateway (SGW) for a particular UE.

SUMMARY

In the 3GPP EPS, a mobility management related function which is typically used is Idle Mode Signaling Reduction (ISR). The purpose of this function is to reduce signaling from a UE in IDLE mode. With ISR the UE may be registered simultaneously in a RA and a TA to the corresponding SGSN and MME, and move freely between 2G/3G and LTE systems without sending RAU or TAU to the network as long as it stays within the registered RA and TA.

During a RAU or TAU procedure, the new SGSN or MME may chose to activate ISR, and indicate to the old SGSN/MME to keep records and association to the SGW for the UE. Also the SGW may be notified to keep the association to the old SGSN/MME. In case of downlink data the SGW may send Downlink Data Notification to both the SGSN over S4 interface and to the MME over S11 interface.

Whenever the UE accesses the network through a new Radio Access Technology (RAT) type, the new RAT shall be reported to the SGW and then forwarded over a S5/S8 interface to the PDN-GW in the Modify Bearer Request message (MBR). The SGW needs to get the new RAT from new MME/SGSN if RAT has changed.

However, when ISR is activated, the new MME/SGSN does not know if RAT has changed and if RAT shall be included in MBR to the SGW, due to the reduced signaling from the UE in Idle mode. Today the new MME/SGSN does not even know if ISR was activated.

Numerous problems may arise from failing to indicate whether or not a new RAT has been utilized. For example, different charging rates may be applied to different RAT types. Therefore, without accurate knowledge of which RAT a particular UE is utilizing, an operator may not be able to provide the correct charging information.

An example object of at least one of the example embodiments presented herein is to provide accurate network information during post idle mobility procedures (e.g., TAU and/or RAU procedures). The technical effect of this solution may therefore be providing an indication as to whether or not a new RAT has been utilized, while minimizing signaling.

The above mentioned objective may be achieved by a method of providing a post idle mobility procedure. A post idle mobility procedure may be any mobility procedure concerning the mobility of a UE upon exiting an idle procedure. For example, the procedure may take place immediately upon exiting the idle procedure or it may take place when a first mobility procedure is initiated upon exiting the idle procedure.

Examples of a post idle mobility procedure may be a TAU or a RAU. An example of an idle procedure may be ISR. It should be appreciated that the example embodiments presented may be directed towards any idle procedure or post idle mobility procedure known in the art. It should further be appreciated that the post mobility procedure may take place at any time upon exiting the idle procedure.

The method may comprise receiving or transmitting a request for the post idle mobility procedure, determining an idle status or indication of an idle procedure, and providing instructions to initiate the request for the post idle mobility procedure, which may be a function of the idle status or indication.

In some example embodiments, the idle status or indication may be provided by an information element which may be in the form of a signal or flag setting. For example, if the idle status or indication is positive, an Idle Mode Signaling Reduction (ISR) may have been initiated.

In some example embodiments, providing instructions to initiate the request for the post idle mobility procedure may further comprise providing a network node with a last Radio Access Technology (RAT) type if the idle status or indication is positive.

In some example embodiments, the idle status or indication may further provide an identification of a last mobility management node in an ISR set-up procedure.

In some example embodiments, providing instructions to initiate the request for the post idle mobility procedure may further comprise providing a network node with a last Radio Access Technology (RAT) type if the idle status or indication is positive and the identification of a last mobility management node is of a different node type as a current mobility management node.

In some example embodiments, a mobility management node type may be a Mobility Management Entity (MME) node or a Serving General Packet Radio Service Support Node (SGSN) node.

In some example embodiments, the transmitting of the request for the post idle mobility procedure may be provided by a User Equipment (UE) node.

In some example embodiments, the receiving of the request for the post idle mobility procedure may be provided by a current MME or SGSN node.

Some example embodiments may be directed towards a method of providing a post idle mobility procedure comprising receiving or transmitting a request for the post idle mobility procedure in a communications network, and providing instructions to initiate the request for the post idle mobility procedure, wherein the instructions may comprise a current RAT type.

Some example embodiments may be directed towards an indication unit for providing a post idle mobility procedure. The unit may comprise a communications port that may be configured to receive or transmit a request for the post idle mobility procedure. The unit may also include a processor that may be configured to determine an idle status or indication. The processor may be further configured to provide instructions to initiate the request for the post idle mobility procedure as a function of the idle status or indication.

In some example embodiments the unit may be further configured to perform at least one of the method steps described above.

In some example embodiments, the unit may be located in a User Equipment, Mobility Management Entity (MME) node, a Serving General Packet Radio Service Support Node (SGSN) node, or in a stand alone node.

Some example embodiments may be directed towards an indication unit for providing a post idle mobility procedure. The unit may comprise a communications port that may be configured to receive or transmit a request for the post idle mobility procedure, and a processor that may be configured to initiate the request for the post idle mobility procedure, wherein the instructions comprise a current Radio Access Technology (RAT) type.

Some example embodiments may be directed towards a computer readable storage medium encoded with computer executable instructions, wherein the instructions, when executed by an indication unit, may perform any one of the method steps described above.

Definitions
ASIC—Application Specific Integrated Circuit
BSC—Base Station Controller
BTS—Base Transceiver Station
DSP—Digital Signal Processor
E-UTRAN—Evolved Universal Mobile Telecommunications System Terrestrial Radio Access Network
FPGA—Field Programmable Gate Array
GERAN—GSM EDGE Radio Access Network
GSM—Global System for Mobile Communications
HSS—High Speed Serial
IP-CAN—Internet Protocol Connectivity Access Network
ISR—Idle Mode Signaling Reduction
LTE—Long Term Evolution
MBR—Modify Bearer Request
MME—Mobility Management Entity
PCEF—Policy and Charging Enforcement Function
PGW—Public data network Gateway
RA—Routing Area
RAN—Radio Access Network
RAT—Radio Access Technology
RAU—Routing Area Update
RBS—Radio Base Station
RNC—Radio Network Controller
SGW—Serving Gateway
SSGN—Serving General Packet Radio Service Support Node
3GPP—Third Generation Partnership Project
TA—Tracking Area
TAU—Tracking Area Update
UE—User Equipment
UMTS—Universal Mobile Telecommunications System
UTRAN—UMTS Terrestrial Radio Access Network
WAN—Wide Area Network
WCDMA—Wideband Code Division Multiple Access

DETAILED DESCRIPTION

In the following description, for purposes of explanation and not limitation, specific details are set forth, such as particular components, elements, techniques, etc. in order to provide a thorough understanding of the example embodiments. However, it will be apparent to one skilled in the art that the example embodiments may be practiced in other manners that depart from these specific details. In other instances, detailed descriptions of well-known methods and elements are omitted so as not to obscure the description of the example embodiments.

Figure 1:
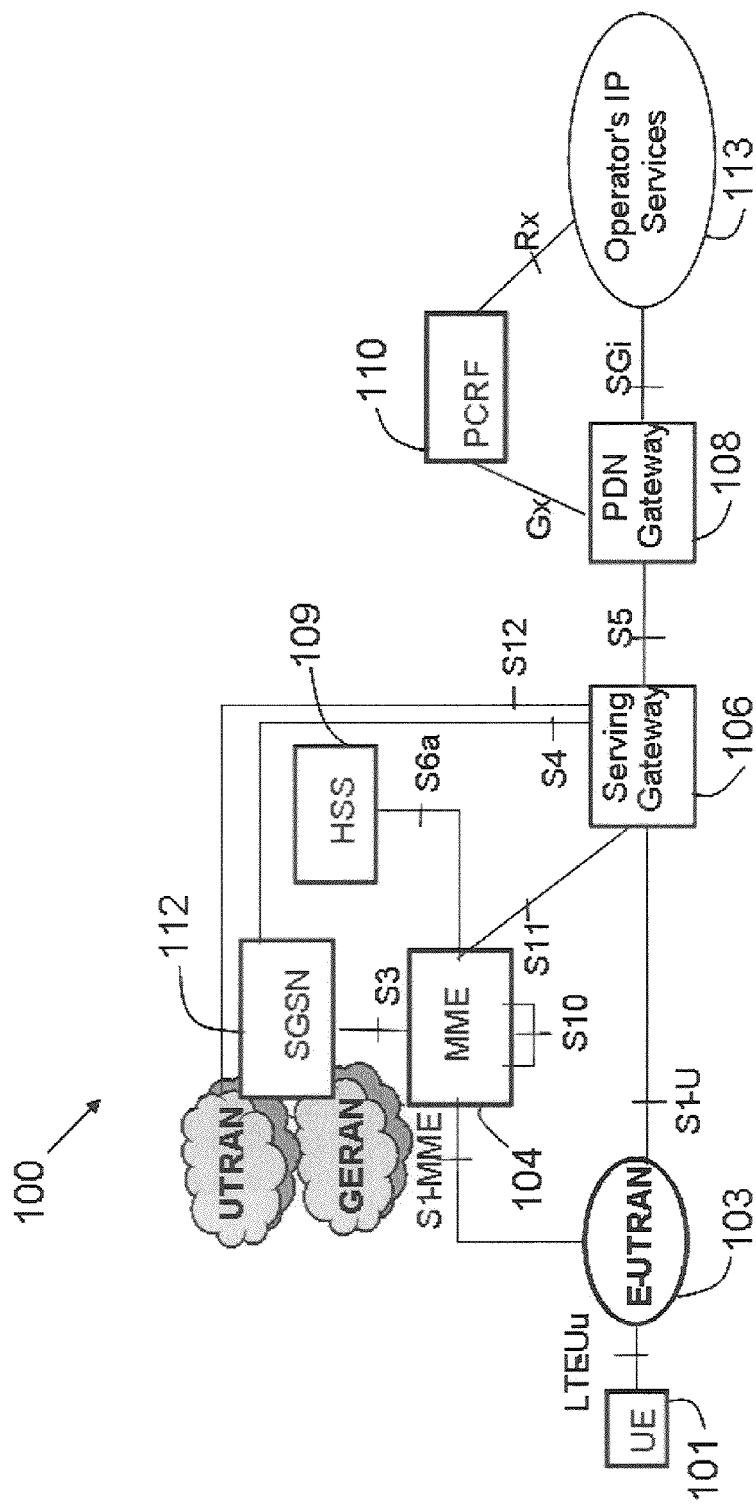
FIG. 1 illustrates a block schematic of a mobile network 100.
Figure 2:
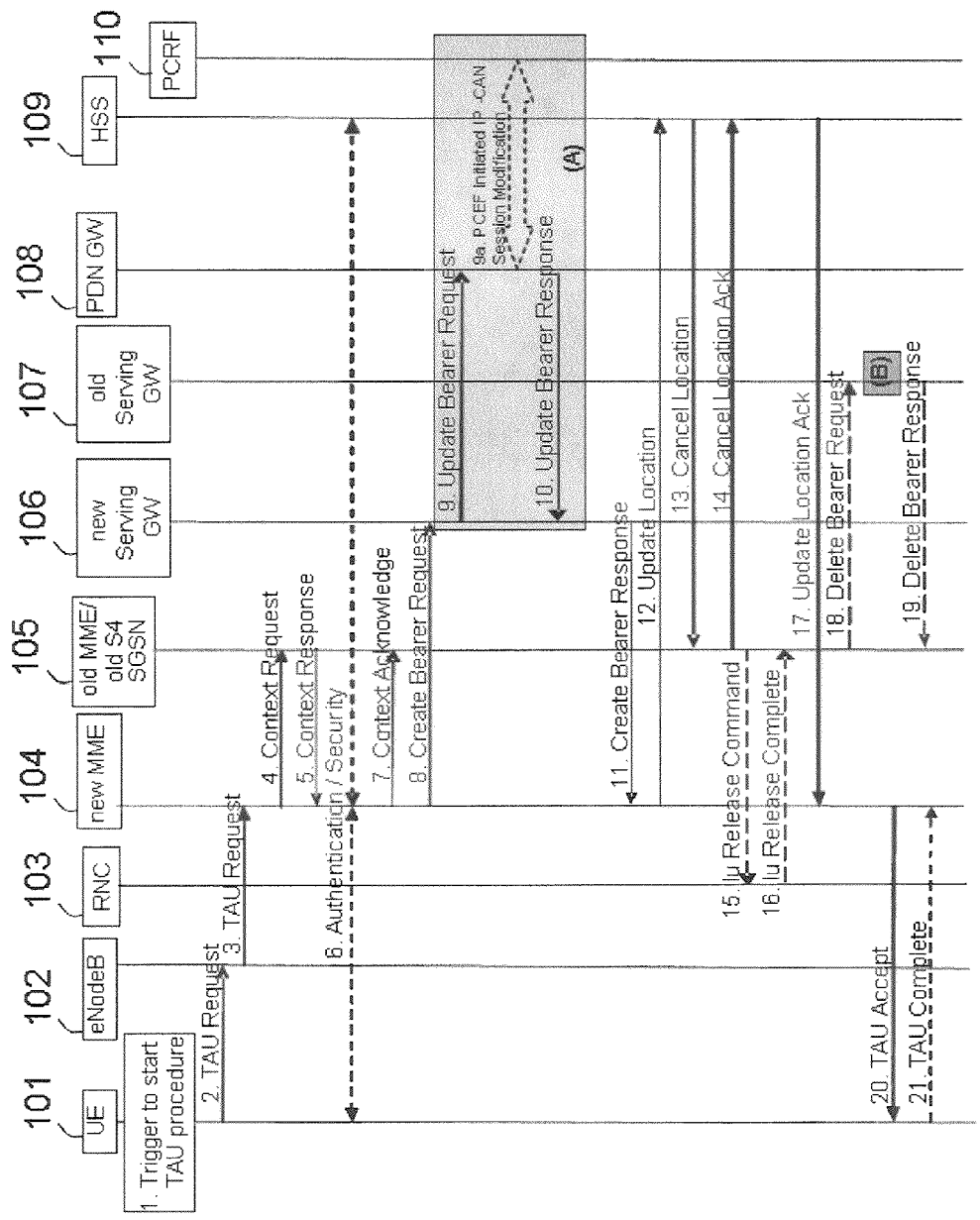
FIG. 2 illustrates a sequence messaging diagram 200 depicting messages among the nodes of FIG. 1 which may be employed during a post idle mobility operation.

FIG. 1 illustrates a block schematic of a mobile network 100 and FIG. 2 illustrates a sequence messaging diagram 200 depicting messages among the nodes of FIG. 1 which may be employed during a post idle mobility operation, specifically, a TAU procedure. It should be appreciated that similar messages may be employed in an RAU procedure or other post idle mobility procedures.

Once a UE 101 enters a TA which is not included in a current TAI list of the UE 101, the UE may initiate a TAU procedure (message 1). The TAU may be initiated when the UE 101 sends a request to an eNodeB 102 within an Evolved Universal Mobile Telecommunications System Terrestrial Radio Access Network (E-UTRAN) 103 (message 2). The eNodeB 102 may be a Base Transceiver Station (BTS) configured to communicate directed with the UEs. The eNodeB 102 may forward the TAU request to a MME 104 within the new TA the UE 101 has entered (message 3). The TAU request may comprise information relating to the UE 101.

Relying on the information comprised in the TAU request, the MME 104 associated with the new TA may send a context request to the MME associated with the TA which the UE 101 utilized prior to entering the new and current TA which may be used to inquire as to the UE's authenticity (message 4). The old MME, or core node, 105 may in return supply a context response which may be used to verify authenticity (message 5).

Upon receiving the context response, an authentication or security connection may be established between the UE 101 and the new MME 104. Similarly an authentication or security connection may also be established between the new MME 104 and a High Speed Serial (HSS) interface 109 (message 6). The HSS 109 may be employed to create a communication link over Wide Area Networks (WANs) links. Thereafter, the new MME 104 may send a context acknowledge message to the old core node 105 acknowledging that the context response was received (message 7).

The new MME 104 may thereafter send a bearer request to a new Serving Gateway (SGW) 106 associated with the new MME 104 and TA the UE 101 is currently in (message 8). The SGW may be responsible for the delivery of data packets from and on the mobile stations within an associated geographical service area. The new SGW 106 may in return send an update bearer request message to the Public data network Gateway (PGW) 108 (message 9). The PGW may provide connectivity from the UE to external packet data networks.

Thereafter, a Policy and Charging Enforcement Function (PCEF) may initiate an Internet Protocol Connectivity Access Network (IP-CAN) session modification (message 9a). The PGW 108 may then send an update bearer response to the new SGW 107, which may in turn send a create bearer response to the new MME 104 (messages 10-11). The new MME 104 may send and update location message to the HHS 109 which may in turn send a cancel location request to the old core node 105 (messages 12-13). The old core node 105 may send a cancel location acknowledgement to the HSS 109 (message 14). For a scenario where the old core node 105 is an SGSN, the old core node 105 may send an Iu Release Command to the Radio Network Controller (RNC) 103 (message 15A), while in a scenario where the old core node 105 is an MME, the old core node 105 may also send an S1AP UE Context Release Command to the old eNodeB 10x (message 15B). The old RNC 103 or the old eNodeB may in turn send an Iu Release Complete message (message 16A) or an S1AP UE Context Release Complete message (message 16B), respectively, to the old core node 105 and the HSS 109 may send an update location acknowledgement to the new MME 104 (message 17). The old core node 105 may send a delete bearer request to the old SGW 107 and the old SGW 107 may in turn send a delete bearer response back to the old core node 105 (messages 18-19). Finally, the new MME 104 may send a TAU accept message forwarding the new TAI list and the UE 101 may send a TAU complete message acknowledging receipt of the TAI list (messages 20-21).

Problems with the TAU procedure presented above may arise when a UE 101 is in a post idle mode. An example of a post idle mode may be when the UE has just ended an Idle Mode Signaling Reduction (ISR) procedure. ISR is a feature that reduces the mobility signaling. During ISR an UE may be registered in an UTRAN/GERAN RA at the same time it is registered in an E-UTRAN TA or list of TAs. Therefore, the UE may be free to switch from a 2G/3G to a LTE system without additional network signaling. The reduced network signaling during ISR also means that the SGW will not be notified of any changes in RAT type.

Figure 3:
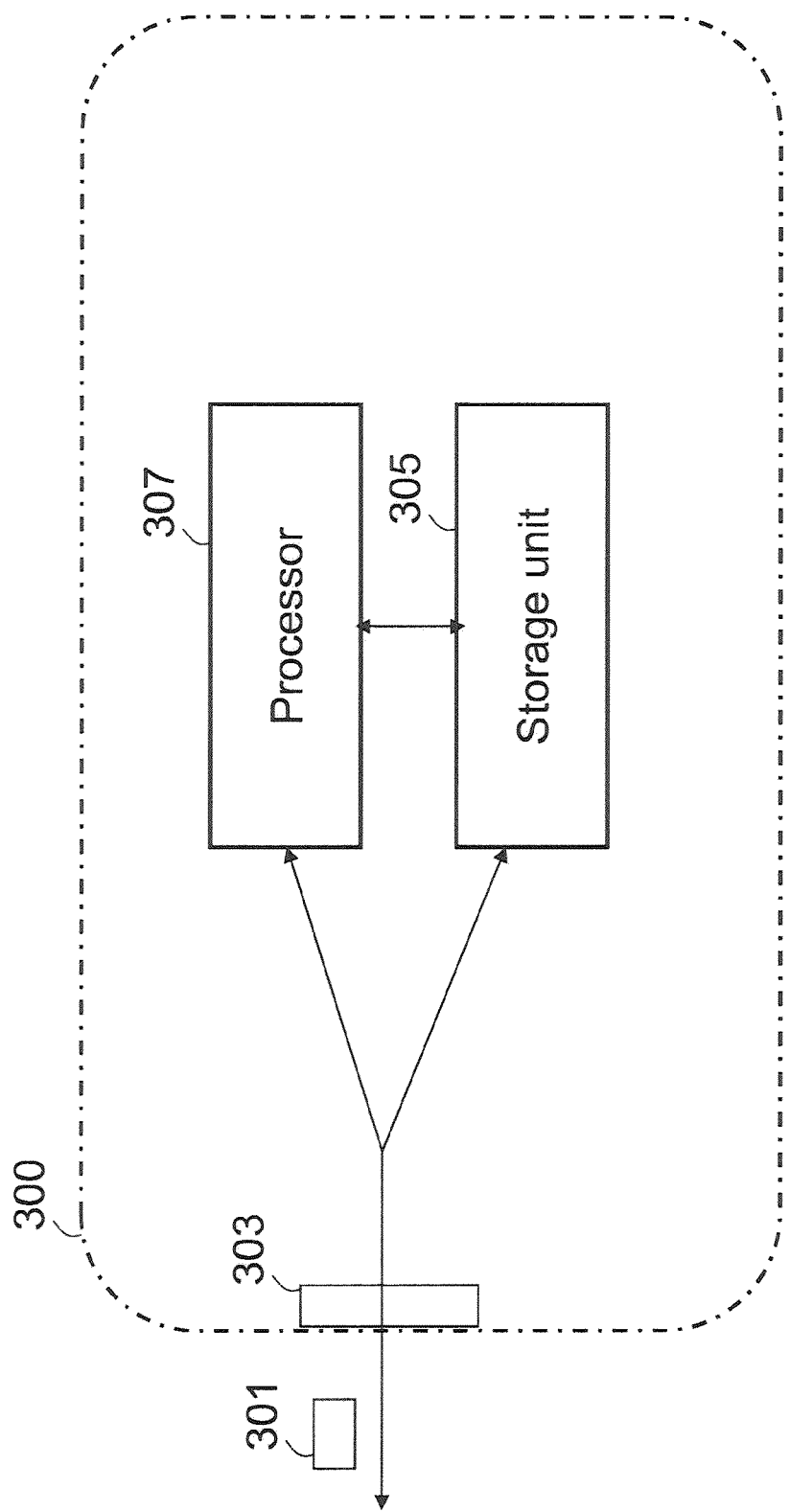
FIG. 3 is an illustrative example of an indication unit 300 which may provide a RAT indication.
Figure 4:
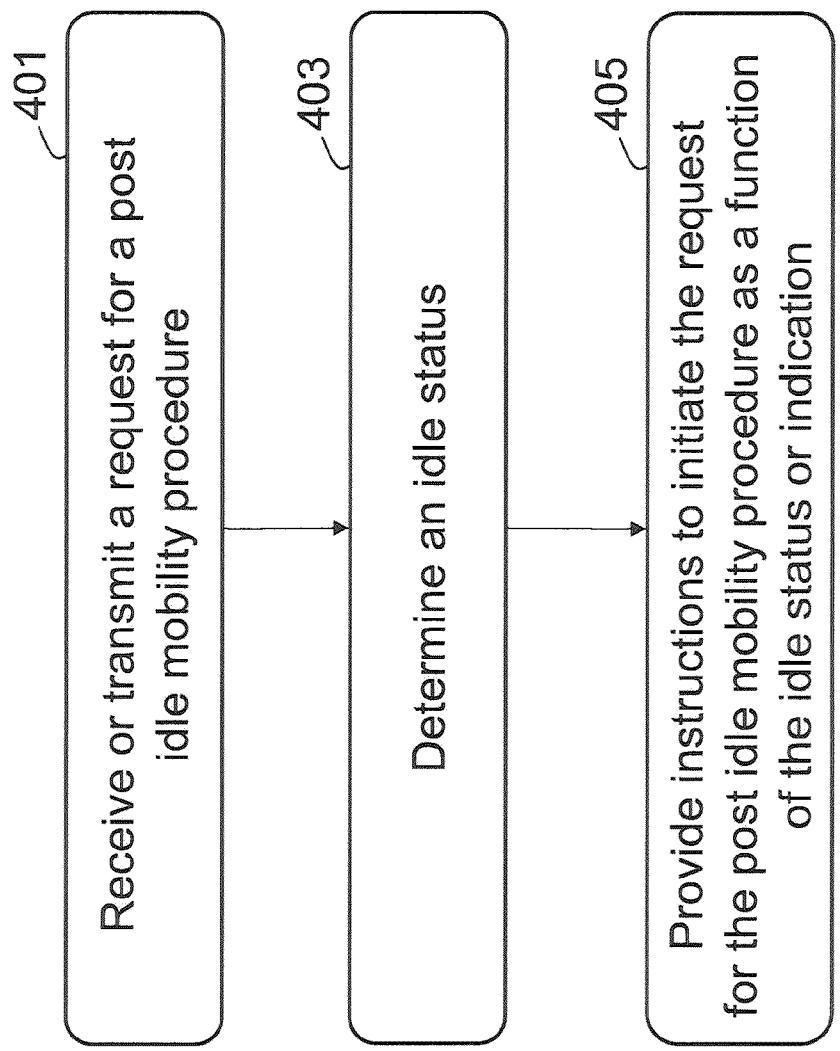
FIG. 4 is a flow diagram depicting example operational steps which may be taken by the indication unit of FIG. 3.

Thus, according to some example embodiments, an indication of whether or not a UE is utilizing a different RAT type in a post idle mode may be provided. FIG. 3 is an illustrative example of an indication unit 300 which may provide a RAT indication and FIG. 4 is a flow diagram depicting example operational steps which may be taken by the indication unit of FIG. 3. It should be appreciated that the indication unit 300 may be located in a UE, MME, SGSN, HSS, or any other node in a wireless network. It should further be appreciated that the indication unit 300 may also be configured as a stand alone node.

Indication Unit

The indication unit 300 may comprise at least one communications port 303 which may be configured to receive and transmit various forms of network communications 301. 35 The network node 300 may also comprise at least one processor 307. The processor 307 may be any suitable type of computation unit arranged to operate software or hardware instruction sets known in the art, e.g. a microprocessor, digital signal processor (DSP), field programmable gate array (FPGA), or application specific integrated circuit (ASIC). The network node 300 may also comprise at least one storage unit 305 which may be any suitable type of computer readable memory and may be of volatile and/or non-volatile type known in the art. The storage unit 305 may be configured to store received, transmitted, and/or measured data and/or executable program instructions.

In operation, the indication unit 300 may be configured to receive or transmit a request 301 for a post idle mobility procedure (401). In an example embodiment where the indication unit is located in the UE 101, the indication unit may be configured to transmit the request for the post idle mobility procedure. In an example embodiment where the indication unit is located in the MME or SGSN, the indication unit 300 may be configured to receive the request for the post idle mobility procedure. It should be appreciated that the post idle mobility procedure may be a RAU or a TAU, or any other post idle mobility procedure known in the art.

Upon receiving or transmitting the request, a determination of an idle status or indication may be made (403). The idle status or indication may be in the form of an information element such as, for example, a signal or flag setting (e.g., an ISR flag setting) indicative of whether or not the UE 101 has undergone an idle procedure. For example, the information element may be in the form of a flag, a one bit signal, two bit signal, or a signal of any number of bits. The idle procedure may be, for example, ISR. Therefore, if the information element is positive, the UE 101 has undergone an idle procedure.

After determining the idle status or indication from the information element, the indication unit 300 may then provide instructions to initiate the request for the post idle mobility procedure as a function of the status or indication (405). It should be appreciated that the example embodiments may provide for the instructions to be given in a number of ways. Below three cases are provided as illustrative examples. It should be appreciated that the example embodiments presented herein may be practiced in other manners and the cases provided below are presented merely as examples.

Case One: Information Element=1 Bit Indicator

In some example embodiments the information element may be provided as a 1 bit indicator. Thus, the information element may provide a positive indication or status if an ISR procedure was initiated. Therefore, the indication unit may be configured to provide instructions that the SGW should be provided with a current RAT type. In the scenario described by case one, the additional signaling provided by the indication unit sending instructions to the SGW need only take place if the information element is positive (i.e., if an ISR procedure occurred).

It should be appreciated that in some example embodiments the decision of whether or not to send a current RAT type may be based solely on whether or not a last mobility management node type is the same as a current mobility management node type (i.e., without an indication of if an ISR occurred or not). Using an indication of whether or not a last mobility management node is of the same type as a current mobility management node will be explained in greater detail in relation to case two.

An example of a benefit provided from this embodiment is that the SGW may be informed of the RAT change with reduced signaling. For example, the SGW is not always updated with a current RAT type, an update only occurs when the information element provides a positive result.

Case Two: Information Element=Multiple Value Flag or Bit Indicator

In some example embodiments the information element may be provided as a multiple value flag or bit indicator. Thus, the information element may provide, for example, a positive indication or status if an ISR procedure was initiated. The information element may also provide, for example, an identification of a last mobility management node utilized in evoking the idle procedure. It should be appreciated that it is the last mobility management node (e.g., an SGSN, or MME) which may update the SGW prior to the start of the ISR mode. Therefore, if the node type of the last mobility management node is not the same as a node type of a current mobility management node, the current RAT type may not be the same as the RAT type stored in the SGW prior to ISR. Thus, by having knowledge of a last mobility management node, a more precise indication of whether or not a new RAT type needs to be provided may be obtained.

For example, if a UE is registered with an MME (e.g., MME1), then beings to utilize a UTRAN system and sends a RAU to a SGSN (e.g., SGSN1), which decides to start ISR, the SGSN1 may signal to the MME1 to keep the UE record or information associated with the UE. The SGSN1 may also signal to UE and to SGW that ISR is activated. It is 30 therefore the SGSN1 which will act as the last node and update the SGW of the RAT type prior to entering ISR (RAT=UTRAN).

During ISR, the UE 101 may be free to interact back and forth between an E-UTRAN subsystem and a UTRAN subsystem. Therefore, a UE 101 may switch back and froth from communicating between the SGSN1 and the MME1. However, the SGW may not be notified of the RAT change. Upon exiting ISR, if the UE 101 is in communication with a new, referred to herein as the current MME2, the information element may provide an indication that the last node is not of a same type (e.g., last node=SGSN1; current node=MME2). Therefore, the current MME2 will know that the RAT type stored in the SGW by the last node (the SGSN1) was the RAT associated with the SGSN1 (RAT=UTRAN). Thus, the RAT type will need to be updated to the current RAT type (RAT current=E-UTRAN).

However, if the current node is a SGSN2 node, the information element may provide an indication that the node type of the current node and the last node are not different (current node=SGSN2; last node=SGSN1). In the case that the node type is same, the current node (SGSN2) will not inform the SGW of the RAT type since the correct RAT type is already stored in the SGW. Thereafter, the correct RAT type will be stored in the SGW upon the execution of the post idle mobility procedure.

An example of a benefit provided from this embodiment is that the SGW may be informed of the RAT change with reduced signaling. In the example embodiment presented in case two, signaling will be used to provide an indication for a RAT change only when such an indication is needed.

Case Three: No Indicator

In some example embodiments an information element may be not be necessary. Specifically, in some example embodiments the current mobility node may be configured to always send the current RAT type, without the use of an information element and regardless of whether or not an update is needed.

An example of a benefit provided from this embodiment is the low level of complexity of the system by removing the step of determining a status or indication of a post mobility procedure.

Working Example

Figure 5:
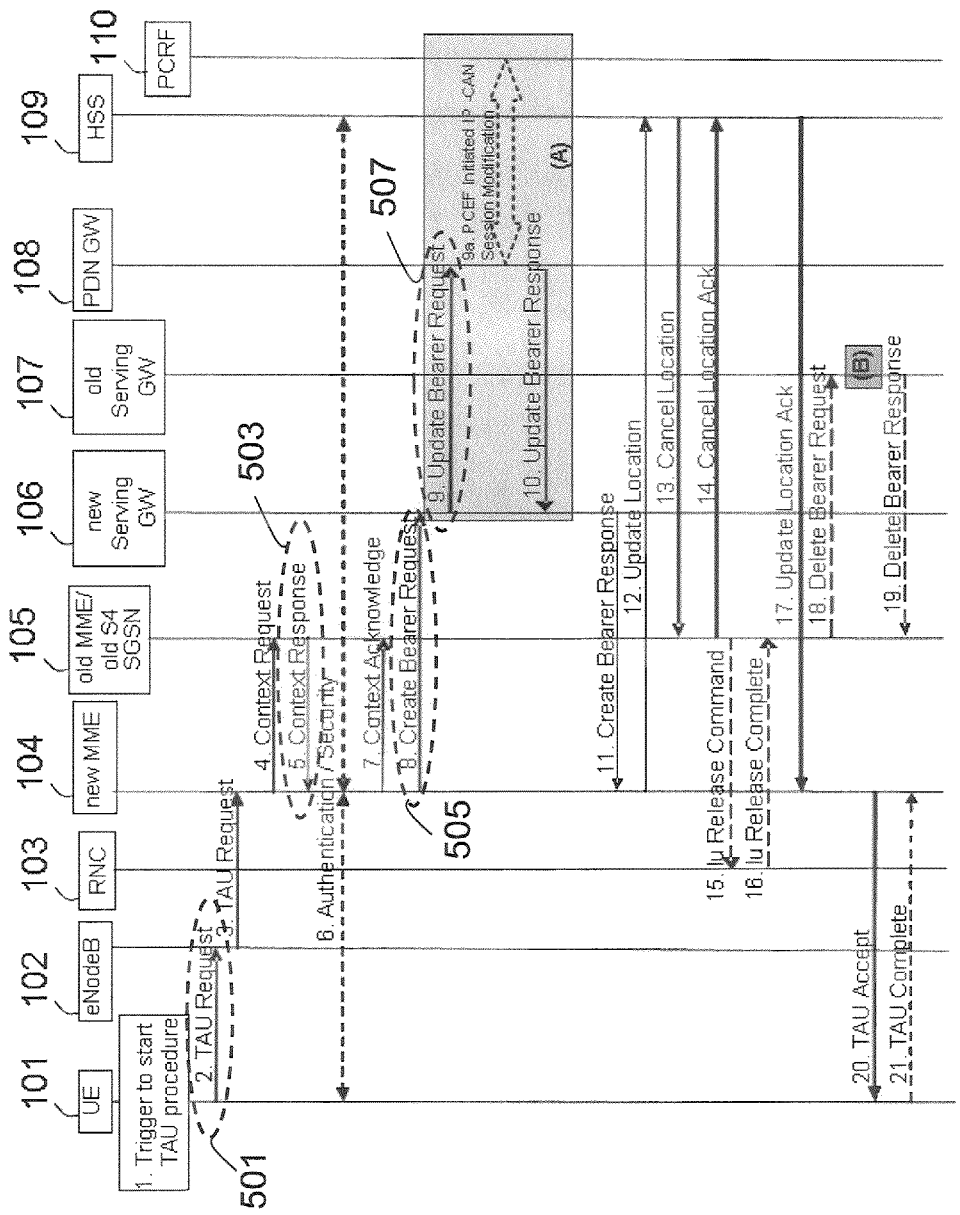
FIG. 5 is a message sequence diagram of a TAU employing some of the example embodiments.

FIG. 5 is a message sequence diagram of a TAU employing some of the example embodiments presented herein. In message 2 (highlighted by circle 501) the UE 101 may send the TAU request featuring the information element. Using the idle information element, the new MME 104 may provide an indication or status update that the RAT type needs to be updated in message 8 (highlighted by circle 505). Thereafter, the new SGW may make any necessary adjustments in an update bearer request as shown in message 9 (highlighted by circle 507). It should be appreciated that the indication unit may be located in the MME, thus in this scenario, the idle status or indication would be provided in message 503.

It should be appreciated that example embodiments presented herein may be applied to a RAU procedure in a similar manner as described in FIG. 5.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, and that several "means" or "units" may be represented by the same item of hardware.

The various embodiments described herein is described in the general context of method steps or processes, which may be implemented in one embodiment by a computer program product, embodied in a computer-readable medium, comprising computer-executable instructions, such as program code, executed by computers in networked environments. A computer-readable medium may comprise removable and non-removable storage devices comprising, but not limited to, Read Only Memory (ROM), Random Access Memory (RAM), compact discs (CDs), digital versatile discs (DVD), etc. Generally, program modules may comprise routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The above mentioned and described embodiments are only given as examples and should not be limiting to the embodiments presented herein. Other solutions, uses, objectives, and functions should be appreciated to be within the scope of the invention as claimed in the below described patent claims.

The invention claimed is:

1. A method providing a post idle mobility procedure, the method comprising:
   receiving or transmitting a request for the post idle mobility procedure in a communications network;
   determining an idle status of an idle procedure including determining an identification of a last mobility management node in an Idle Mode Signaling Reduction (ISR) set-up procedure, where the idle status is positive when the ISR has been initiated; and
   providing instructions to initiate the request for the post idle mobility procedure as a function of the idle status including providing a Radio Access Technology (RAT) indicator when the idle status is positive and providing an identification that the last mobility management node is of a different node type as a current mobility management node.

2. The method of claim 1, wherein the step of receiving or transmitting further comprises the post mobility procedure being a Routing Area Update (RAU) or a Tracking Area Update (TAU).

3. The method of claim 1, wherein the step of providing instructions to initiate the request for the post idle mobility procedure further comprises providing a network node with a last Radio Access Technology (RAT) type if the idle status is positive.

4. The method of claim 1, wherein a mobility management node type is a Mobility Management Entity (MME) node or a Serving General Packet Radio Service Support Node (SGSN) node.

5. The method claim 1, wherein the step of transmitting the request for the post idle mobility procedure is provided by a User Equipment (UE) node.

6. The method of claim 1, wherein the step of receiving the request for the post idle mobility procedure is provided by a current MME or SGSN node.

7. An indication unit for providing a post idle mobility procedure, the unit comprising:
   a communications port configured to receive or transmit a request for the post idle mobility procedure in a communications network;
   a processor configured to determine an idle status of an idle procedure, where the idle status is positive when an Idle Mode Signaling Reduction (ISR) has been initiated and where the idle status provides an identification of a last mobility management node in an ISR set-up procedure; and
   the processor further configured to provide instructions to initiate the request for the post idle mobility procedure as a function of the idle status including providing a Radio Access Technology (RAT) indicator when the idle status is positive,
   wherein the processor is further configured to provide an identification that the last mobility management node is of a different node type as a current mobility management node.

8. The unit of claim 7, wherein the unit is located in a User Equipment, Mobility Management Entity (MME) node, a Serving General Packet Radio Service Support Node (SGSN) node, or in a stand alone node.

9. The unit of claim 7, wherein the post mobility procedure is a Routing Area Update (RAU) or a Tracking Area Update (TAU).

10. The unit of claim 7, wherein the processor is further configured to provide a network node with a last Radio Access Technology (RAT) type if the idle status or indication is positive.

11. The unit of claim 7, wherein the mobility management node type is a Mobility Management Entity (MME) node or a Serving General Packet Radio Service Support Node (SGSN) node.

* * * * *

UNITED STATES PATENT AND TRADEMARK OFFICE
CERTIFICATE OF CORRECTION

PATENT NO. : 8,861,435 B2  
APPLICATION NO. : 12/979612  
DATED : October 14, 2014  
INVENTOR(S) : Yang et al.

Page 1 of 1

It is certified that error appears in the above-identified patent and that said Letters Patent is hereby corrected as shown below:

On the title page item 75, under "Inventors", in Column 1, Line 2,
delete "Västra Frölunda" and insert -- Göteborg --, therefor.

In the specification

In Column 5, Line 60, delete "HHS 109" and insert -- HSS 109 --, therefor.

In Column 6, Line 40, delete "301. 35" and insert -- 301. --, therefor.

In Column 7, Line 67, delete "is 30" and insert -- is --, therefor.

In Column 8, Line 34, delete "may be not be" and insert -- may not be --, therefor.

In the claims

In Column 10, Line 5, in Claim 5, delete "method claim" and insert -- method of claim --, therefor.

Signed and Sealed this
Eighth Day of March, 2016

Michelle K. Lee
*Director of the United States Patent and Trademark Office*